United States Patent
Taglang

(10) Patent No.: US 6,409,182 B1
(45) Date of Patent: Jun. 25, 2002

(54) LATHE CHUCK WITH TWO SETS OF JAWS

(75) Inventor: Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/564,482

(22) Filed: May 4, 2000

(30) Foreign Application Priority Data

May 5, 1999 (DE) ......................................... 199 20 763

(51) Int. Cl.$^7$ .......................... B23B 31/16; B23B 31/12
(52) U.S. Cl. ...................................... 279/132; 279/110
(58) Field of Search ................................. 279/132, 133, 279/137, 60, 110

(56) References Cited

U.S. PATENT DOCUMENTS

| | | | | |
|---|---|---|---|---|
| 3,633,929 A | * | 1/1972 | Morawski et al. | 279/132 |
| 3,751,053 A | * | 8/1973 | Swanson | 279/132 |
| 4,570,950 A | * | 2/1986 | Morawski et al. | 279/132 |
| 5,941,538 A | * | 8/1999 | Gonnocci | 279/132 |

* cited by examiner

Primary Examiner—Steven C. Bishop
(74) Attorney, Agent, or Firm—Herbert Dubno; Andrew Wilford

(57) ABSTRACT

A lathe chuck has a chuck body rotatable about an axis and having a plurality of angularly equispaced and axially forwardly open angled guides, a set of first jaws in some of the guides, and a set of second jaws in the other guides alternating with the first jaws. Respective first and second actuating plates coupled to the respective sets of jaws are axially displaceable to radially displace the jaws in the guides. An actuating shaft axially is displaceable in the body. A rocker connects the shaft with the plates for limited relative axial movement of the plates so that the first jaws can engage the workpiece before the second jaws. The actuating shaft has a tubular front end, a core shaft is axially connected to one of the plates and coaxially received in the actuating-shaft end, and a tube shaft is axially connected to the other of the plates and coaxially surrounds the actuating-shaft end. This actuating-shaft end in turn has a radially throughgoing hole through which the rocker extends. The core and tube shafts have radially aligned seats receiving ends of the rocker. A biasing unit, for instance a spring or pressure-operated piston unit, is engaged between the actuating-shaft end and the tube shaft to bias them apart.

10 Claims, 3 Drawing Sheets

LATHE CHUCK WITH TWO SETS OF JAWS

FIELD OF THE INVENTION

The present invention relates to a lathe chuck. More particularly this invention concerns such a chuck having two sets of workpiece-holding jaws.

BACKGROUND OF THE INVENTION

A standard lathe chuck has a chuck body centered on and normally rotated by a headstock about an axis. At least three angularly equispaced jaws are received in this body in respective guides that allow front ends of the jaws to move radially of the axis. Back ends of the jaws are engaged by an actuating plate that is displaced axially in one direction to move the jaws radially inward toward each other and in the opposite axial direction to move them oppositely outward.

In order to machine a brake disk, bearing ring, or the like the initial normally cast workpiece, which is not perfectly rotation symmetrical, must be gripped by the jaws so the workpiece center lies on the axis. The chuck is then rotated so that a workpiece engaging the outer and/or inner surface of the workpiece machines it until it is perfectly centered on the rotation axis.

The chuck jaws normally move perfectly synchronously inward and outward relative to the axis so that they have a tendency to deform a thin-walled workpiece into a more symmetrical shape than it actually has. When the workpiece is machined while thus deformed, it reverts to its original shape when released from the chuck and, therefore, is out of round.

Accordingly it is known to provide three centering jaws on a chuck and a second set of jaws that serve for holding. Due to the multiple points of contact, the likelihood of deforming the workpiece is substantially reduced. The first set of jaws grips the workpiece lightly to center it without deforming it, the second set of jaws is brought in to bear lightly on the workpiece between the first set of jaws, then all the jaws are pressed inward to lock the workpiece in place, normally without deforming it.

While this system works well in theory, in practice there are considerable problems in synchronizing the action of the second set of jaws with the first set. In particular when the jaws are pressing with quite some force it is difficult to avoid deforming the workpiece.

OBJECTS OF THE INVENTION

It is therefore an object of the present invention to provide an improved lathe chuck with two sets of workpiece-holding jaws.

Another object is the provision of such an improved lathe chuck with two sets of workpiece-holding jaws which overcomes the above-given disadvantages, that is which can solidly grip an out-of-round workpiece without deforming it.

SUMMARY OF THE INVENTION

A lathe chuck has according to the invention a chuck body rotatable about an axis and having a plurality of angularly equispaced and axially forwardly open angled guides, a set of first jaws in some of the guides, and a set of second jaws in the other guides alternating with the first jaws. Respective first and second actuating plates coupled to the respective sets of jaws are axially displaceable to radially displace the jaws in the guides. An actuating shaft is axially displaceable in the body. A rocker connects the shaft with the plates for limited relative axial movement of the plates so that the first jaws can engage the workpiece before the second jaws.

Thus with this system as the actuating shaft is retracted the first jaws, normally numbering three, will engage the workpiece lightly and will center it on the axis. As the actuating shaft continues to retract, the rocker will cause the second jaws to engage the workpiece. With subsequent retraction there will be no more rocking action and all the jaws will move inward identically. Even if the workpiece is out of round, it will be gripped uniformly with no deformation.

The actuating shaft has a tubular front end, a core shaft is axially connected to one of the plates and coaxially received in the actuating-shaft end, and a tube shaft is axially connected to the other of the plates and coaxially surrounds the actuating-shaft end. This actuating-shaft end in turn has a radially throughgoing hole through which the rocker extends. The core and tube shafts have radially aligned seats receiving ends of the rocker. A biasing unit, for instance a spring or pressure-operated piston unit, is engaged between the actuating-shaft end and the tube shaft to bias them apart. With this system the axial tension is effective on the plate of the first jaws to move them synchronously against the workpiece to load the biasing unit, whereupon the second jaws move in to engage the workpiece.

The other plate according to the invention is limitedly rockable on the tube shaft and a plurality of angularly spaced biasing units, springs normally, are engaged between the tube shaft and the other plate. To achieve this effect the other plate has a central seat and the tube shaft has an enlarged head that can swivel in the seat. The other plate can have a planar front face engageable against a planar back face of the one plate so that n a rest position all the jaws are equispaced from the axis.

A plurality of such rockers are angularly equispaced about the axis. Each such rocker has an enlarged central part forming a fulcrum and engaging the actuating-shaft end. The rocker ends are smaller than the central part. To keep the first jaws on center the one plate has an axial forward extension axially slidable in the chuck body.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
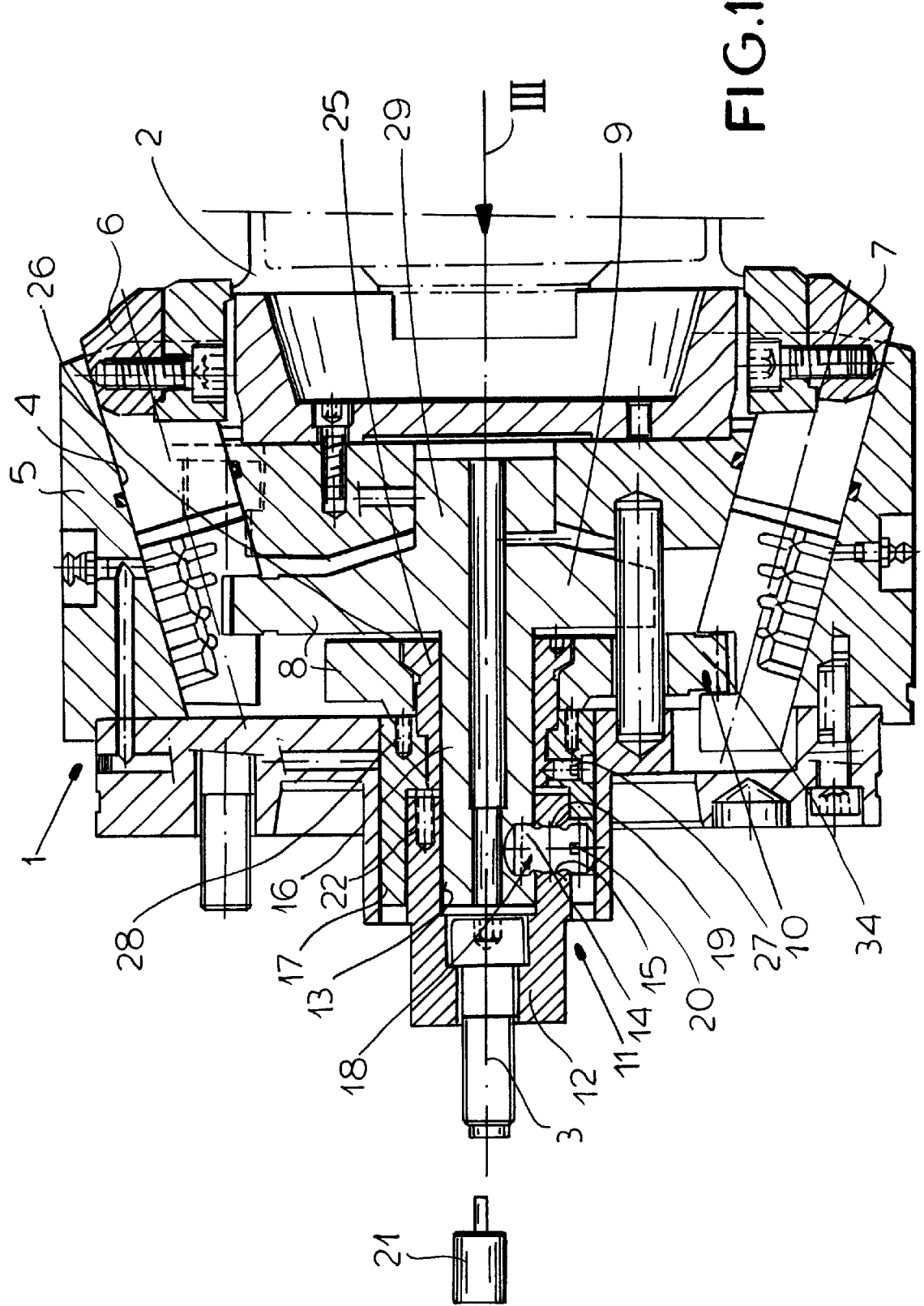
FIG. 1 is an axial section through a lathe chuck according to the invention.
Figure 3:
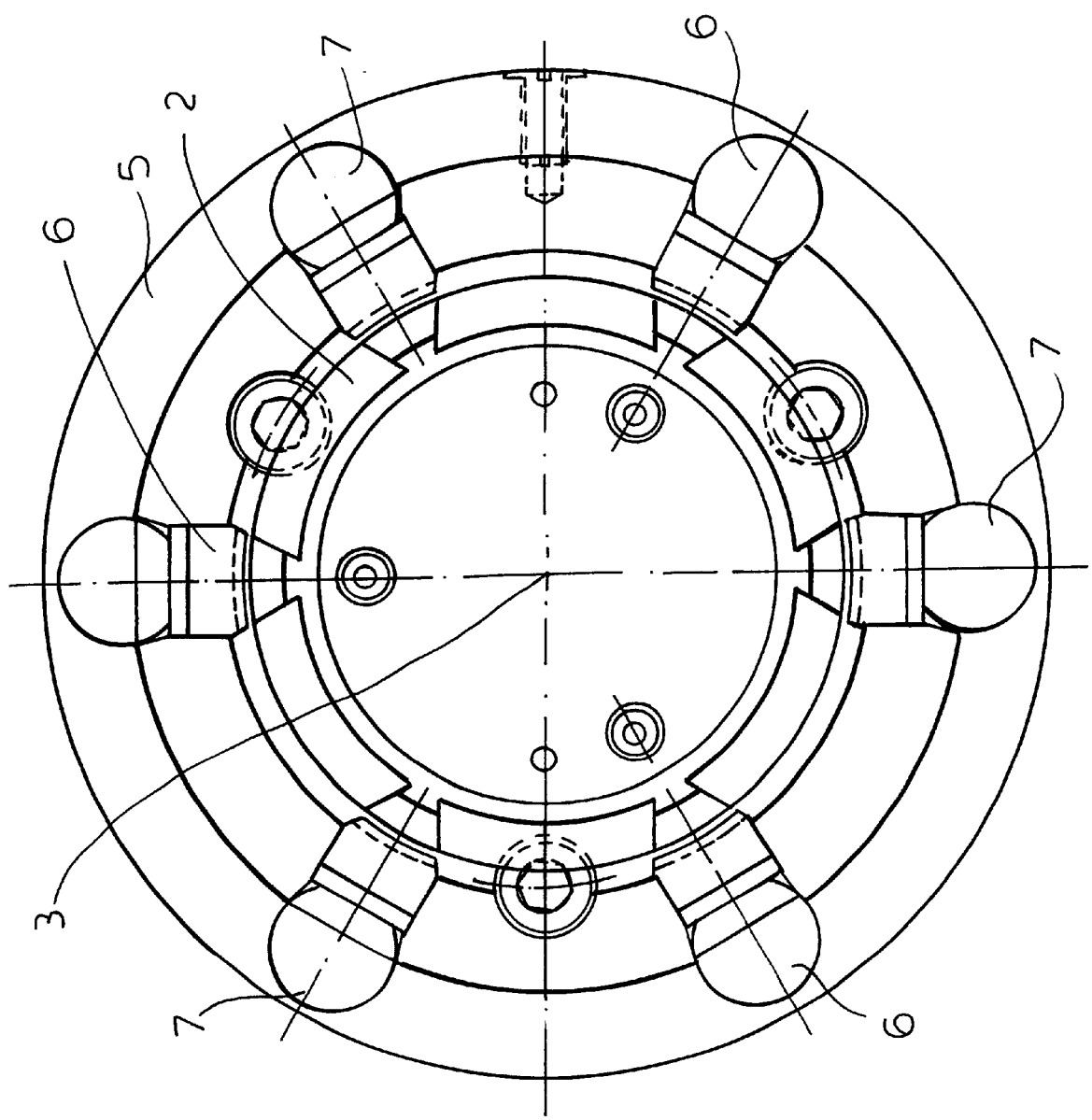
FIG. 3 is an end view taken in the direction of arrow III of FIG. 1.

As seen in FIGS. 1 and 3 a lathe chuck 1 according to the invention has a chuck body 5 centered on an axis 3 and provided with six angled guides 4 holding a first set of three jaws 6 and a second set of three jaws 7 interleaved with the first jaws 6 and intended to hold a thin-walled workpiece 2 with their front ends. A jaw actuator 8 is formed by a pair of plates 9 and 10 respectively coupled to the back ends of the jaws 6 and 7. An axially centered and tubular actuating shaft 12 can be moved axially by an actuator such as shown schematically at 21 to synchronously displace the jaws 6 and 7 axially backward (toward the left in FIG. 1) and thus radially toward one another or axially forward and radially apart.

In order to permit the jaws 7 to move limitedly relative to each other and to the jaws 6, a rocker system 11 is provided connecting the shaft 12 to the plates 9 and 10. More particularly, the front plate 9 connected to the jaws 6 and having a cylindrical front-end extension 29 guided in the body 5 has a rearward extension formed as a core shaft 16 axially shiftable in an interior 13 of the tubular actuating shaft 12. The back plate 10 is formed by a ring disk 34 engaging the jaws 7 and having a central seat 26 in which can rock a ball head of a sleeve 25 secured by screws 27 to an outer tube shaft 17 coaxially surrounding the actuating shaft 12. Springs 28 set in the shaft 17 bear axially forward on the ring 34 which is limitedly axially movable relative to the shaft 17. Similarly, springs 22 set in the actuator shaft 12 press on the coupled shaft 17 and sleeve 25 to urge them axially forward.

The rocker system 11 comprises a plurality of angularly spaced radially extending steel rocker pins 18 (only one shown) each seated in a radially throughgoing bore 15 of the tubular actuating shaft 12 and pivotal about an axis extending secantally of the axis 3. The rocker pin 18 has a central annular ridge 19 engaging the actuating shaft 12 and acting as fulcrum and to smaller-diameter inner and outer ends 14 and 20 respectively received in the core shaft 16 and tube shaft 17. Thus rocking of the pin 18 allows the two shafts 16 and 17 to move limitedly axially relative to each other, thereby allowing the jaws 6 and 7 to move limitedly radially relative to one another so that they can conform to an out-of-round shape of the workpiece 2. The ring 34 can similarly tilt on the shaft 17 to further compensate for out of roundness.

Figure 2:
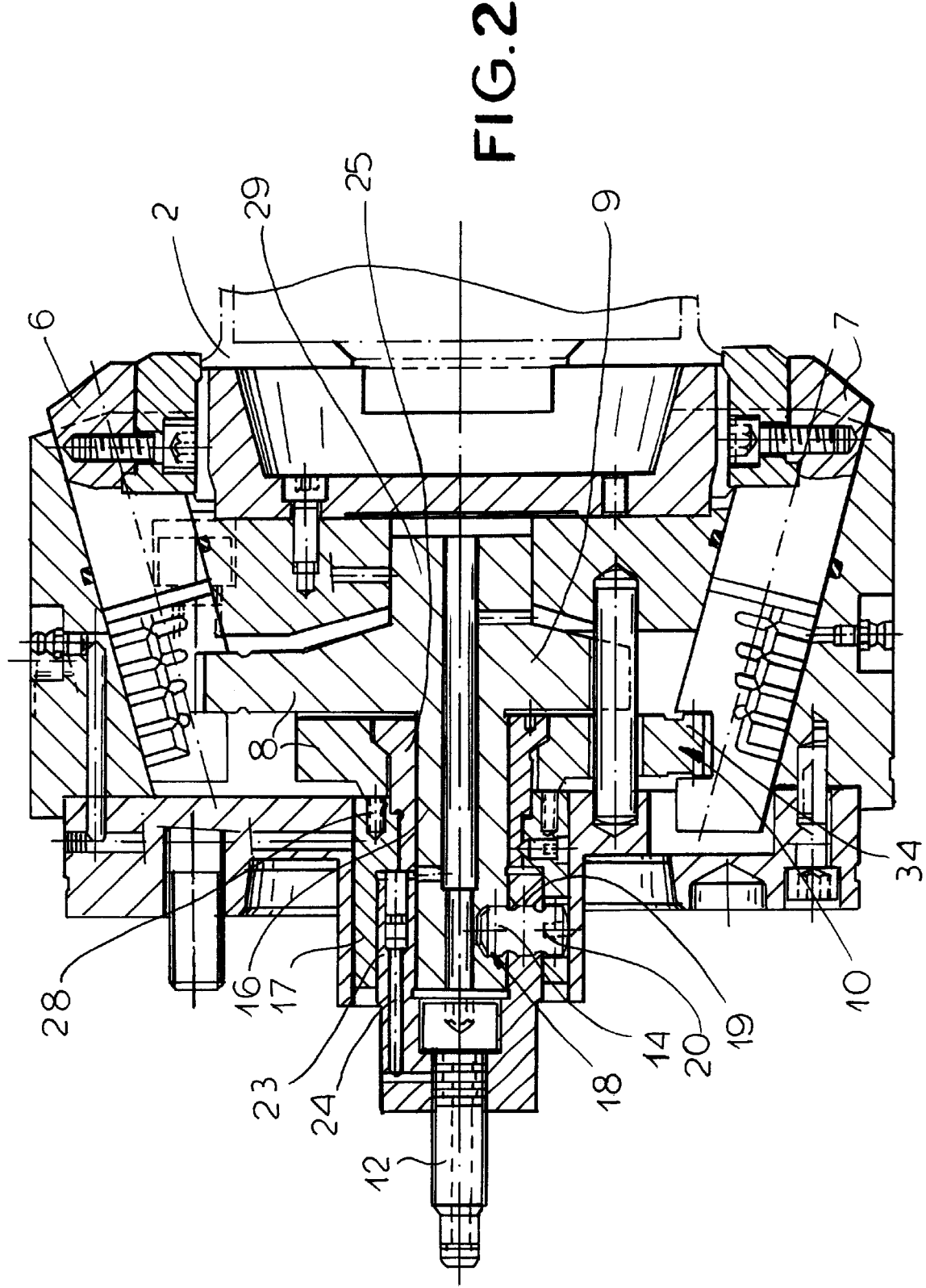
FIG. 2 is a view like FIG. 1 showing a variation on the chuck.

In FIG. 2 the springs 24 are replaced by small pistons 23 fed through hydraulic lines 24. Otherwise this arrangement is identical to that of FIGS. 1 and 3.

With this system backward movement of the shaft 12 will pull back the plates 8 and 9. Engagement of the first set of jaws 6 with the workpiece 2 will center this workpiece on the axis 3. As the jaw 6 engage the workpiece 2, they will meet some resistance, and the rocker pin 18 will pivot so as to accurately bring the jaws 7 into engagement with the workpiece 2. As the shaft 12 continues to retract the plate 34 will rock limitedly on the shaft 17, 25, so all the jaws 6 and 7 will move inward identically so that the workpiece 2 is not deformed.

I claim:

1. A lathe chuck comprising:
   a chuck body rotatable about an axis and having a plurality of angularly equispaced and axially forwardly open angled guides;
   a set of first jaws in some of the guides;
   a set of second jaws in the other guides alternating with the first jaws;
   respective first and second actuating plates coupled to the respective sets of jaws and axially displaceable to radially displace the jaws in the guides;
   an actuating shaft axially displaceable in the body and having a tubular front end formed with a radially throughgoing hole; and
   means including
      a core shaft axially connected to one of the plates, formed with a seat aligned radially with the actuating-shaft end hole,
      a tube shaft axially connected to the other of the plates, formed with a seat aligned radially with the actuating-shaft end hole, and
      a rocker extending through the hole, having ends engaged in the seats, and connecting the shaft with the plates
   for limited relative axial movement of the plates, whereby the first jaws can engage the workpiece before the second jaws.

2. The lathe chuck defined in claim 1, further comprising biasing means engaged between the actuating-shaft end and the tube shaft and biasing same axially apart.

3. The lathe chuck defined in claim 2 wherein the biasing means is a spring.

4. The lathe chuck defined in claim 2 wherein the biasing means is a pressure-operated piston unit.

5. The lathe chuck defined in claim 1 wherein the other plate is limitedly rockable on the tube shaft, the chuck further comprising
   a plurality of angularly spaced biasing means engaged between the tube shaft and the other plate.

6. The lathe chuck defined in claim 5 wherein the biasing means are springs.

7. The lathe chuck defined in claim 5 wherein the other plate has a central seat and the tube shaft has an enlarged head that can swivel in the seat.

8. The lathe chuck defined in claim 1 wherein a plurality of such rockers are angularly equispaced about the axis.

9. The lathe chuck defined in claim 1 wherein the rocker has an enlarged central part forming a fulcrum and engaging the actuating-shaft end, the rocker ends being smaller than the central part.

10. The lathe chuck defined in claim 1 wherein the one plate has an axial forward extension axially slidable in the chuck body.

* * * * *